G. C. HAWKINS.
Fruit-Picker.

No. 208,090. Patented Sept. 17, 1878.

Witnesses:
C. Clarence Poole
W. F. Morsell

Inventor:
George C. Hawkins
By H. H. Evans & Co.
attys

UNITED STATES PATENT OFFICE.

GEORGE C. HAWKINS, OF STEWARTSTOWN, WEST VIRGINIA.

IMPROVEMENT IN FRUIT-PICKERS.

Specification forming part of Letters Patent No. 208,090, dated September 17, 1878; application filed July 24, 1878.

*To all whom it may concern:*

Be it known that I, GEORGE C. HAWKINS, of Stewartstown, Monongalia county, State of West Virginia, have invented a new and Improved Fruit-Picker, of which the following is a full, clear, and exact description, reference being had to the accompanying drawings, making part of this specification, in which—

Figure 1:
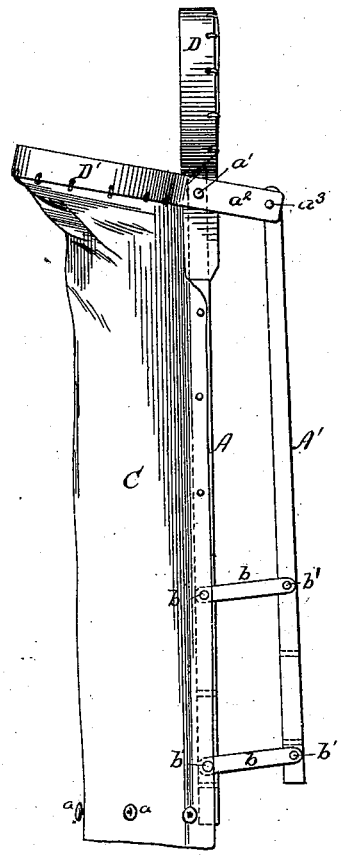
Figure 2:
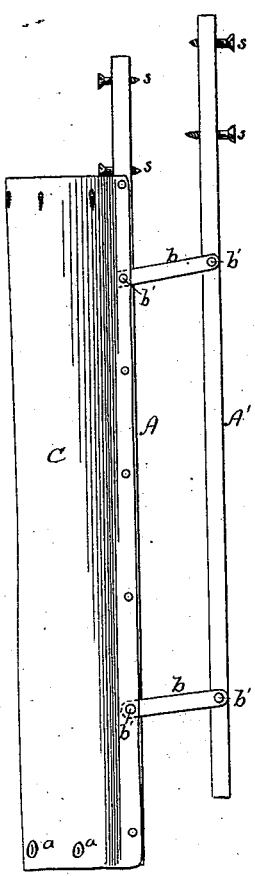

Figure 1 is a side view of my new and improved fruit-picker. Fig. 2 is an extension attachment for the same.

The object of my invention is to provide a fruit-picker that will convey the fruit to the hand without the necessity of lowering the picker from the tree, and thereby preventing the fruit from falling on the ground and getting bruised, and at the same time have such leverage in operating the jaws as to be able to pull the fruit directly from the twig or stem, or to pull the twig, together with the fruit, by seizing the twig with a grasp sufficiently strong to enable the operator to twist the twig off the tree. To accomplish this I have a grasping-jaw rigidly fixed to a rod, and in a line therewith, and a swinging jaw pivoted to it with a lever-extension, to which I attach a second rod, and at intervals connect the two rods by means of pivoted links of the same length with the lever-extension before named. A canvas or other tube has its end stitched around the movable jaw to conduct the fruit to the ground. There is a necessity for having the two bars always parallel during the operation of the machine, and the links pivoted at intervals accomplish this.

In order that those skilled in the art may make and use my invention, I will proceed to describe the manner in which I have carried it out.

A A' are thin rods placed parallel to each other, and connected by the links $b\ b\ b$, and pivoted loosely to each rod at $b'\ b'\ b'$. C is a canvas spout attached to the rods A, and having hooks or buttons at its lower end to connect with another similar bag or spout attached in the same manner to extension-rods similar to A A', connected by links $b\ b\ b$ in the same manner as shown in Fig. 2. There may be any number of extensions attached to each other, so that apples, pears, peaches, and other fruits on the highest branches of a tree may be reached. The extensions are connected to each other by screws $s\ s$, or other suitable fastenings, and the canvas spouts C, which are attached to each extension, are connected together by buttons $a\ a$ or hooks, so as to form a continuous spout from the jaws of the picker to the hand, operating the rods at their lower ends.

D D' are hoops, which form the pickers. The hoop D is rigid with the rod A and covered with canvas at the back. The hoop D' is provided with an arm, $a^2$, which is pivoted to arm A at $a^1$, and also connected to the rod A' and pivoted at $a^3$.

The canvas spout C is connected with the hoop D' and also rod A by tacks or other suitable fastenings. The upper end of the shaft or rod A' forms a spring, which, acting on the arm of the hoop or jaw D', always keeps it open, but is made to close when the rod A' is drawn downward by the hand.

The operation of my device is as follows: To take an apple off the tree, the implement is applied to the apple, the jaws being open. The apple is received, and by drawing on the rod A' the jaws are nearly closed, there being a space between the top of the hoops to allow of the escape of twigs, so that the apple may be detached easily. When the apple is released from the branch it falls down in and through the canvas spout, and is thus conveyed directly to the hand of the operator. It may then be deposited in a basket.

There is no necessity to lower the picker from the tree. The moment the pressure of the hand is withdrawn from off the rod A' the spring acting on the arm of the hoops D' opens the jaws instantly, and are ready to receive another apple.

I am aware that fruit-pickers have heretofore been constructed with movable jaws, with one jaw fixed and one movable, and with flexible spouts, and in a variety of other ways; and hence I claim no element broadly; but

What I claim as new, and desire to secure by Letters Patent, is—

The rod A, with rigid hoop D, and parallel rod A', with hoop D', provided with lever-extension $a^2$, in combination with the stiff pivoted connecting-links $b$ and spout C, all constructed and arranged as set forth.

GEORGE C. HAWKINS.

Witnesses:
 LAWRENCE DUNNE,
 JOHN C. WAGNER.